United States Patent [19]

Lucia

[11] 4,388,196
[45] Jun. 14, 1983

[54] FILTER WITH HEAT CONTROLLED FLUID FLOW BYPASS

[75] Inventor: Carroll J. Lucia, Green Bay, Wis.

[73] Assignee: Claude A. Patalidis, Southfield, Mich.

[21] Appl. No.: 256,104

[22] Filed: Apr. 21, 1981

Related U.S. Application Data

[63] Continuation-in-part of Ser. No. 178,037, Aug. 14, 1980, Pat. No. 4,306,966.

[51] Int. Cl.³ .............................................. B01D 35/02
[52] U.S. Cl. ..................................... 210/742; 210/774; 210/805; 210/168; 210/446; 210/456; 210/149
[58] Field of Search ............... 210/149, 445, 456, 446, 210/742, 774, 805, 168

[56] References Cited

U.S. PATENT DOCUMENTS

| | | | |
|---|---|---|---|
| 2,672,984 | 3/1954 | Russell | 210/149 X |
| 2,729,339 | 1/1956 | McCoy | 210/149 X |
| 3,168,468 | 2/1965 | Jagdmann | 210/445 X |
| 3,687,290 | 8/1972 | Myers | 210/149 |
| 3,875,063 | 4/1975 | Tarplin | 210/456 X |
| 4,181,611 | 1/1980 | Rubenstein | 210/149 |

Primary Examiner—John Adee
Attorney, Agent, or Firm—Hauke and Patalidis

[57] ABSTRACT

A filter comprising a housing in which are disposed a filtering element and a bypass channel establishing direct communication between the inlet and the outlet of the filter. The outlet of the bypass is closed below a predetermined temperature by a thermally operated diaphragm member. When the temperature of the fluid flowing through the filter housing reaches the predetermined temperature, the diaphragm member is deformed such as to open the bypass outlet. The filter has particular applications for installing in the line between a motor vehicle automatic transmission and the transmission fluid cooler, after the transmission has been overhauled or when a rebuilt transmission is installed on the motor vehicle.

12 Claims, 9 Drawing Figures

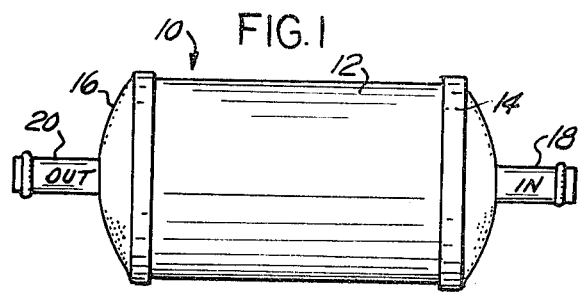
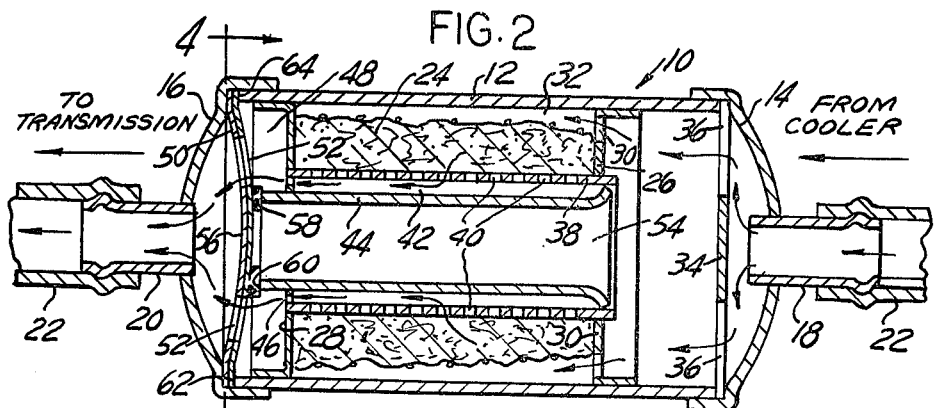
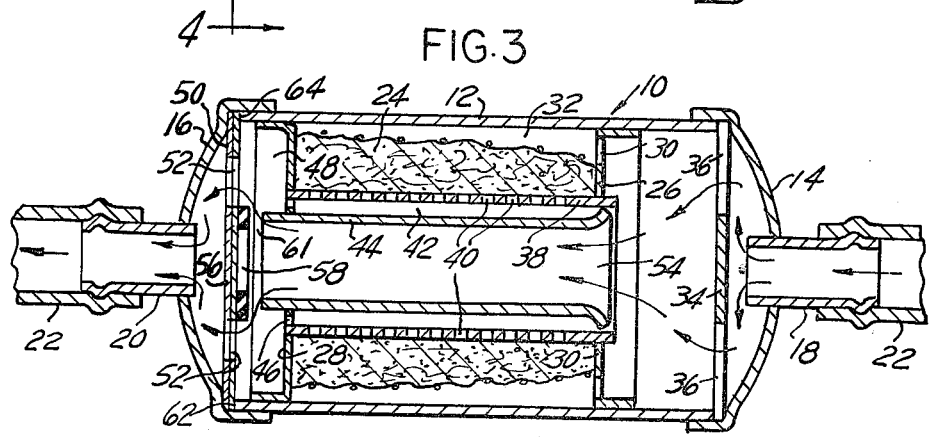
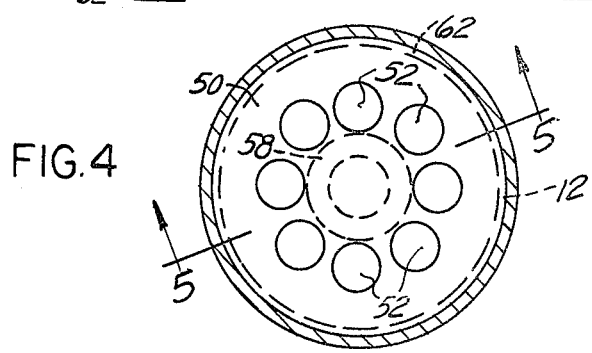

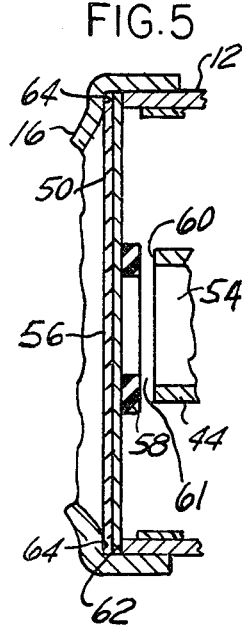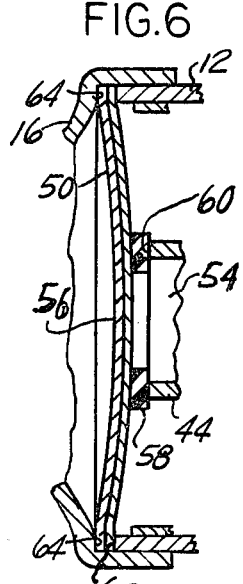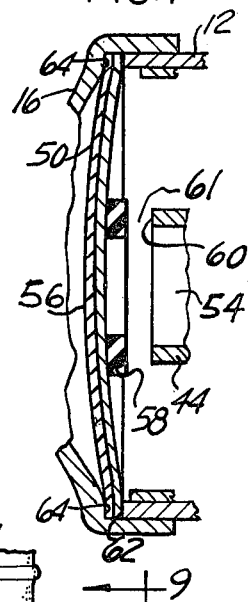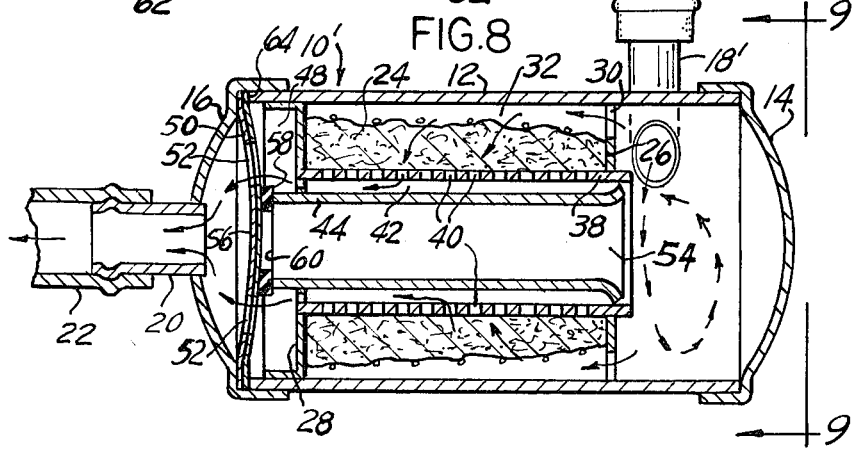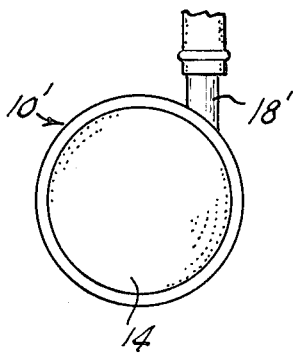

FILTER WITH HEAT CONTROLLED FLUID FLOW BYPASS

CROSS REFERENCE TO RELATED APPLICATION

The present application is a continuation-in-part of application Ser. No. 178,037, filed Aug. 14, 1980, now U.S. Pat. No. 4,306,966, issued Dec. 22, 1981.

BACKGROUND OF THE PRESENT INVENTION

In prior U.S. Pat. No. 4,306,966, for Heat Control Filter Element Bypass, there is disclosed a filter element for connection between a mechanism using a flow of fluid for its operation, such as an automotive automatic transmission, and a cooler for cooling the fluid after it has effected work in the mechanism and has absorbed heat. A bypass is disposed in the filter manifold or header and is normally closed by a valve operated by a solenoid controlled by a heat responsive element disposed in the flow of fluid at the inlet of the manifold or header. When the temperature of the fluid becomes excessive, the valve opens, and the fluid being returned from the cooler flows directly from the cooler to the transmission without flowing through the filtering element of the filter. As the fluid no longer flows through the filter element, which normally causes a substantial back pressure reducing the flow of fluid in the cooler return circuit, opening of the bypass greatly increases the flow of fluid through the system and consequently prevents the fluid from overheating.

Fluid filters are seldom installed in automatic transmission systems of motor vehicles such as passenger cars, trucks and buses when the vehicles are manufactured. It has been found that such filters are not required in new installations because the whole system, including the cooler, the automatic transmission casing and mechanism, and the piping between the transmission and the cooler, is carefully flushed during manufacturing and assembly such as to remove any dust, dirt, chips and the like. Most automatic transmission failures in the field are caused by overheating. Failed transmissions are either overhauled or replaced by rebuilt transmissions. When an overhauled or rebuilt transmission is reinstalled in a motor vehicle, costly filters are generally installed in the line between the cooler and the transmission, in order to trap any dirt, debris and other contaminant which may be present in the overhauled or rebuilt transmission casing and in the cores of the cooler. Although overhauled transmissions or rebuilt transmissions are often bench flushed prior to reinstalling in a motor vehicle, flushing of the cooler presents many problems and is generally neglected, and even bench flushing of the transmission itself is often subjected to shortcuts or complete neglect. Furthermore, re-assembly and re-installation of overhauled or rebuilt transmissions are evidently not effected with the same cleanliness which normally accompanies assembly and installation of new clean parts on the assembly lines of the manufacturer's plant.

It is therefore a somewhat conventional practice to install a fluid filter in the line between the cooler and the transmission housing at the same time that an overhauled or rebuilt transmission is reinstalled in a motor vehicle. Such a filter necessarily causes a pressure drop that seriously reduces the fluid flow between the cooler and the transmission, especially as the filter element becomes partially plugged with dirt and contaminants, with the result that fluid flow to the cooler is substantially reduced and causes a tendency for the fluid to overheat. As most automatic transmission failures are due to overheating, the overhauled or rebuilt transmission may fail only after a few hours of operation. This rather common failure, due to overheating after a few hours of operation, coincides, paradoxically, with the few hours required to operate a rebuilt or overhauled transmission with a filter. This is due to the fact that any loose dirt and solid particles present in the system are trapped in the filter element during the first few hours of operation of an overhauled or rebuilt transmission.

SUMMARY OF THE PRESENT INVENTION

The present invention provides a small low cost filter for installation in systems where filters are required only for a short period of time, such as the filter installed between an automatic transmission cooler and the automatic transmission casing when reinstalling an overhauled or rebuilt transmission in a motor vehicle. The filter of the invention is fully effective only during the first few hours of operation after reinstalling an overhauled or rebuilt transmission, and is fully operative only until an overheating condition occurs for the first time. The present invention accomplishes its objects and presents the advantage of providing a filter which, in a few hours of operation, permits to remove from the fluid flow system of an automatic transmission all the debris and contaminants and which upon overheating of the fluid beyond a predetermined temperature opens up, reversibly or irreversibly, a bypass passageway built in the filter itself. The invention accomplishes those results by providing a bi-metallic valve member normally closing the bypass passageway in the filter which, upon being heated to a predetermined temperature, becomes momentarily or permanently deformed such as to open the bypass passageway for providing full unimpeded flow of the fluid, for example between an automatic transmission cooler and the automatic transmission casing.

The diverse objects and advantages of the present invention will become apparent to those skilled in the art when the following description of the best modes contemplated for practicing the invention is read in conjunction with the accompanying drawing wherein like reference numerals refer to like or equivalent parts and in which:

BRIEF DESCRIPTION OF THE DRAWINGS

FIG. 1 is a side elevation view of a filter according to the present invention;

FIG. 2 is a longitudinal section therethrough showing the internal structure thereof;

FIG. 3 is a view similar to FIG. 2, but showing the filter of the invention in operation with its fluid bypass passageway open;

FIG. 4 is a cross-sectional view from line 4—4 of FIG. 2;

FIG. 5 is a partial sectional view from line 5—5 of FIG. 4 showing the shape of the bimetallic bypass flow control member of the filter of the invention in an intermediary position;

FIGS. 6 and 7 are views similar to FIG. 5, but showing the bimetallic member in extreme positions;

FIG. 8 is a view similar to FIG. 2, but showing a modification of the invention; and FIG. 9 is an end view thereof from line 9—9 of FIG. 8.

DETAILED DESCRIPTION OF THE PREFERRED EMBODIMENTS

Referring to the drawings, and more particularly to FIG. 1, a filter with built-in heat operated bypass according to the present invention, generally designated at 10, has the general appearance of a conventional in-line filter having a cylindrical housing 12 provided at each end with a dome-shape enclosure cap, designated 14 and 16 respectively, a tubular fitting being mounted through each one of the dome-shaped closure walls, as shown at 18 and 20 respectively. The tubular fitting 18 defines an inlet for a fluid to be passed through the filter 10, and the tubular fitting 20 define an outlet for the fluid having flowed through the filter.

The filter 10 has particular usefulness for installation, for example, in the line from the cooler to the transmission of a motor vehicle, such as a passenger car, truck or bus, when the transmission, either rebuilt or overhauled, is re-installed in the motor vehicle. For that purpose, the line from the cooler to the transmission casing, which is in the form of a hose 22, is cut, and the filter 10 is connected serially in the transmission fluid flow in the proper direction such that the fluid coming from the cooler is introduced by the inlet fitting 18 into the housing 12, flows through the interior of the housing 12 to the outlet fitting 20 from which it is returned to the transmission casing. An annular filtering cartridge or element 24 is disposed in the filter housing 12 between a pair of transverse annular baffles 26 and 28. The annular baffle 26 is provided with a plurality of ports 30 disposed proximate its periphery where it is attached to the inner surface of the housing 12 by any convenient means such as brazing, soldering or spot welding. The ports 30 allow the fluid flowing into the housing 12 through the inlet fitting 18 to circulate in an annular space 32 formed between the periphery of the filtering cartridge 24 and the inner surface of the housing 12. A baffle 34 may be disposed, as shown, proximate the outlet of the inlet fitting 18 to diverge the flow of fluid peripherally through a plurality of apertures 36 disposed in the baffle 34 in alignment with the ports 30 through the annular baffle 26. The filtering cartridge 24, which consists of any convenient filtering medium capable of filtering particles as small as about 20 microns, is provided with a tubular core 38 having a plurality of apertures 40 allowing the filtered fluid to flow into an annular passageway 42 defined between the filtering element tubular core 38 and a tubular member 44 fastened by appropriate soldering, brazing or welding, concentric to the filtering element tubular core 38. The transverse annular baffle 28 is imperforate at its portion engaging the end of the filtering element 24, but is provided with a plurality of ports 46 disposed about a circular row, and which allow the fluid having passed through the filtering element 24 to the annular space 42 through the apertures 40 to flow into an annular chamber 48 formed between the annular baffle 28 and a heat deformable diaphragm member, such as a bimetallic deformable valve disk 50. The bimetallic valve disk 50 has a plurality of apertures 52, preferably at least four in number, FIG. 4, normally placing the filtered fluid flowing into the annular chamber 48 in communication with the outlet fitting 20 of the filter 10.

The tubular member 44 define a bypass channel 54 which is normally closed at its outlet end by the bimetallic valve disk 50 being normally deformed such as to be warped or dished in a direction that causes its imperforate central portion 56 to engage the edge 60 of the tubular member 44 forming the outlet of the bypass channel 54. Preferably, and as illustrated, the appropriate surface of the central portion of the bimetallic valve disk 50 is provided with an elastomeric ring 58 attached thereto by any convenient means such as cementing or rivets and providing a substantially leak-proof joint between the central portion 56 of the dished valve disk 50 and the edge 60 of the tubular member 44. The bimetallic valve disk 50 is made of a convenient bimetallic material such as an aluminum and steel laminate, or an iron-nickel alloy and copper laminate or any other convenient bimetallic laminate of metals or alloys having different coefficients of thermal expansion. At FIG. 2, the bimetallic valve disk 50 is shown bowed out or dished such that fluid flowing from the inlet fitting 18 to the outlet fitting 20 of the filter 10 is caused to flow through the filtering element 24, thus removing any solid particle which may be entrained in the fluid flow. Very little fluid, if any, flows through the bypass 54.

After a few hours of operation of the motor vehicle, the filter element 24 has trapped most, if not all, of the dirt and solid particles entering the automatic transmission fluid flow, as experience indicates. Because the filtering element 24 becomes gradually clogged, the back pressure caused by the filtering element progressively increases and the flow of fluid through the filter 10 progressively decreases. Consequently, due to reduced fluid flow through the cooler, cooling effectiveness of the cooler is progressively reduced resulting in increased heating of the fluid passing through the filter 10. The bimetallic valve disk 50 is pre-set such as to remain warped or dished in the direction that closes the outlet of the bypass channel 54 below, for example, a temperature of 65° C. (150° F.), and to become flat at 65° C., as shown at FIG. 3. When the bimetallic valve disk 50 flattens, its central portion 56 is no longer warped or dished towards the outlet edge 60 of the tubular member 44 defining the bypass channel 54, with the result that the majority of the fluid flow takes place through the bypass channel 54, through the space 61 between the edge 60 of the tubular member 44 at its outlet and the bimetallic valve disk central portion 56, and through the ports 52 in the bimetallic valve disk 50 to the outlet fitting 20 of the filter 10. The majority of the fluid flow takes place through the bypass channel 54, and because the space or gap 61 is still relatively narrow, some fluid flow takes place through the filtering element 24 as an inverse function of the back pressure caused by the filter element, the back pressure having further been increased in proportion to the amount of clogging of the filtering element 24.

The bimetallic valve disk 50 is fastened in the filter housing 12 by its peripheral edge sandwiched between a terminal rim 62 of the filter housing 12 and an annular shoulder 64 formed on the inside of the outlet dome-shaped end wall 16. As shown at FIG. 5, the bimetallic valve disk 50 is installed in a flat condition in the filter housing 12 during manufacture after being heated to about 65° C., and is preferably pre-stressed such that as it cools below 65° C. it takes the appropriate dished condition illustrated at FIG. 6 which cause the bypass channelway 54 to be closed. When the bimetallic valve disk 50 is heated, as a result of heat being transferred from the fluid in circulation through the filter 10, again to 65° C., it tends to flatten as shown at FIGS. 3 and 5, thus providing progressively increasing fluid flow through the bypass channelway 54. If the temperature of the fluid drops below 65° C., thus causing a decrease in the temperature of the bimetallic valve disk 50, the bimetallic valve disk recovers its dished shape, thus progressively closing the gap 61 and reducing the fluid flow rate through the bypass channel 54. However, beyond a temperature of about 71° C. (160° F.), the uneven expansion of the two superimposed metal or alloy layers of the bimetallic valve disk 50 causes the bimetallic valve disk to become cambered or dished in an opposite direction, as illustrated at FIG. 7, there causing a progressive widening of the gap 61, further progressively increasing the fluid flow through the bypass channel 54, as the temperature of the fluid increases until some temperature equilibrium is achieved. In such a mode of operation, the bimetallic valve disk actually operates as a thermostatic element increasing the fluid flow rate through the bypass channel 54 as a function of temperature, and progressively closing the bypass channel 54 as the fluid is cooling, thus insuring relative rapid warm-up of the fluid to normal operation temperature ranges.

In another mode of operation, the bimetallic valve disk 50 may be pre-stressed, for example by slight tight fit within the end of the housing 12 during assembly, such as to cause pressure to be applied radially from the edge of the disk towards its center. With appropriate built-in pre-stress, when the bimetallic valve disk 50 becomes heated to a temperature, for example in the range of 65° C. to 75° C., it permanently snaps into the dished shape of FIG. 7, thus permanently opening the bypass channel 54 to full fluid flow. In such a mode of operation full bypass fluid flow is effected through the filter 10 as soon as the temperature of the automatic transmission fluid, while operating the motor vehicle, exceeds for the first time the limit for which the bimetallic valve disk 50 has been pre-set to fully open the gap 61. Such a mode of operation may be made entirely irreversible, which presents no inconveniences whatsoever as the majority of the dirt and solid particles, if not all, has been filtered from the fluid flow system during the first few hours of operation of an overhauled or rebuilt transmission. However, if so desired, under such mode of operation the bimetallic valve disk 50 may be pre-stressed such that at a preselected very low temperature, for example $-10°$ to $-30°$ C., the bimetallic valve disk snaps back to its dished shape causing closing of the gap 61 to provide cut-off of the fluid flow through the bypass channel 54, and a rapid warming up of transmission fluid, and thus restarting the cycles of operation previously described.

The filter unit 10', illustrated at FIGS. 8 and 9, is structurally and functionally identical to the filter 10 of FIGS. 1-3, with the exception that rather than providing aligned inlet and outlet for the filter, the inlet fitting, as shown at 18', is disposed tangentially to the housing 12, with the result that the fluid is introduced within the housing 12 with a circular swirling motion.

Although the bimetallic valve disk 50 is mounted in the housing 12 such as to obturate the outlet of the bypass channel 54 below a predetermined temperature, it will be appreciated that it could be mounted proximate the inlet of the bypass channel such as to obturate the inlet below the predetermined temperature. However, it is preferable to mount the bimetallic valve disk 50 at the outlet of the bypass channel as excessive fluid pressure will tend to open the bypass channel by urging the central portion 56 of the bimetallic valve disk away from the bypass channel outlet rather than tending to close the bypass channelway as would be the case if the bimetallic valve disk were to be installed at the inlet of the bypass channel.

Having thus described the present invention by way of practical examples of structure, given for illustrative purpose only, modifications whereof will be apparent to those skilled in the art, what is claimed as new is as follows:

1. A fluid filter comprising a housing having an inlet and an outlet, a filtering element disposed in said housing, means in said housing for directing said fluid from said inlet for passage through said filtering element, a bypass channelway through said filtering element in said housing placing said inlet in direct communication with said outlet, and thermostatically operated valving means closing said bypass channelway below a predetermined temperature for causing said fluid to flow through said filtering element and opening said bypass channelway to flow of fluid above said predetermined temperature, wherein said thermostatically operated valving means comprises a thermally deformable bimetallic disk peripherally attached to said housing and disposed proximate an end of said bypass channelway, said bimetallic disk being dished below said predetermined temperature such as to close said channelway end, and said bimetallic disk being deformed at said predetermined temperature such as to open said channelway end, said bimetallic disk having an imperforate central portion engaged with said channelway end below said predetermined temperature and a perforate peripheral portion for passage therethrough of said fluid passing through said filtering element.

2. A filter for installation in a motor vehicle automatic transmission fluid circulation system, said filter comprising a tubular housing closed at both ends, an inlet for introducing said fluid in said housing disposed at one end of said housing and an outlet for exhausting said fluid disposed at the other end of said housing, an annular filtering element disposed in said housing, a tubular member disposed within said filter element concentric thereto and spaced therefrom such as to form an annular passageway for said fluid having passed through said filtering element, said tubular member having an inlet and an outlet and defining a bypass passageway for direct flow of said fluid from said housing inlet to said housing outlet, a thermally deformable disk member mounted in said housing proximate the outlet of said tubular member, said disk member being peripherally attached to said housing and having an occluding portion engaged with said outlet of said tubular member below a predetermined temperature and disposed away from said outlet edge above said predetermined temperature, whereby said bypass passageway is closed by said heat deformable disk below said predetermined temperature and opened through deformation of said disk above said predetermined temperature, wherein said disk is a bimetallic dished member and said occluding portion is an imperforate central portion thereof adapted to cover said tubular member outlet edge when in said dished shape below said predetermined temperature, said disk having a plurality of apertures beyond said imperforate portion for allowing flow of fluid therethrough.

3. The filter of claim 2 wherein said disk is arranged to return to its original shape when its temperature drops below said predetermined temperature.

4. The filter of claim 2 wherein said disk remains with said occluding portion away from said bypass channel outlet edge when said temperature drops below said predetermined temperature.

5. The filter of claim 2 wherein said inlet and said outlet are aligned.

6. The filter of claim 2 wherein said inlet directs the flow of fluid into said housing tangentially to said housing.

7. A method for filtering the hydraulic fluid of a motor vehicle automatic transmission until said fluid becomes heated at least at a predetermined temperature, said fluid being circulated through a line between the transmission and a fluid cooler, said method comprising connecting a filter in series in the fluid flow line between said fluid cooler and said transmission, providing a first fluid flow path in said filter through a filtering element and a second fluid flow path bypassing said filtering element, preventing fluid flow through said second fluid path bypassing said filtering element and permitting fluid flow through said first fluid flow path below said predetermined temperature, and subsequently permitting fluid flow through said second fluid flow path bypassing said filtering element above said predetermined temperature.

8. The method of claim 7 further comprising re-establishing fluid flow through said first fluid path bypassing said filtering element when the temperature of said fluid drops below said predetermined temperature.

9. The method of claim 7 wherein fluid flow through said second fluid flow path bypassing said filtering element is maintained when the temperature of said fluid drops below said predetermined temperature.

10. The method of claim 9 further comprising re-establishing fluid flow through said first fluid flow path through said filtering element when the temperature of said fluid drops below a second predetermined temperature lower than said first mentioned predetermined temperature.

11. The method of claim 7 wherein said second fluid flow path bypassing said filtering element is closed below said predetermined temperature by a thermally deformable diaphragm member obturating said second fluid flow path bypassing said filtering element above said predetermined temperature by thermal deformation of said diaphragm member.

12. The method of claim 11 wherein said diaphragm member is a bimetallic disk member.

* * * * *